US012590590B2

(12) United States Patent
Duong

(10) Patent No.: US 12,590,590 B2
(45) Date of Patent: Mar. 31, 2026

(54) AIRCRAFT ENGINE IMPELLER WITH EXDUCER SHROUD FORWARD SWEEP

(71) Applicant: Pratt & Whitney Canada Corp., Longueuil (CA)

(72) Inventor: Hien Duong, Mississauga (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 18/583,544

(22) Filed: Feb. 21, 2024

(65) Prior Publication Data

US 2025/0264111 A1 Aug. 21, 2025

(51) Int. Cl.
*F04D 29/28* (2006.01)
*B64C 11/00* (2006.01)
(Continued)

(52) U.S. Cl.
CPC .......... *F04D 29/284* (2013.01); *B64C 11/001* (2013.01); *F01D 5/04* (2013.01); *F04D 1/00* (2013.01); *F04D 29/441* (2013.01)

(58) Field of Classification Search
CPC .... F04D 29/284; F04D 29/30; F04D 29/4206; F04D 29/441; F04D 29/444; F04D 17/10; F04D 29/162; F04D 29/44; F04D 29/448; F04D 29/685; F04D 29/288; F04D 1/06; F04D 1/00; F04D 27/0215; F04D 29/2216; F04D 29/28; F04D 29/324; F04D 29/384; F04D 29/68; F04D 29/526; F05D 2250/52; F05D 2250/70; F05D 2240/304; F05D 2240/121; F05D 2250/38; F05D 2240/303; F05D 2260/96; F01D 5/141; F01D 5/04;
(Continued)

(56) References Cited

U.S. PATENT DOCUMENTS 2,658,338 A * 11/1953 Leduc ................... F04D 29/441
415/178
3,197,124 A * 7/1965 Sallou ................... F04D 29/442
415/198.1
(Continued)

FOREIGN PATENT DOCUMENTS

CN 110985436 A 4/2020
EP 3064741 A1 9/2016

OTHER PUBLICATIONS

Search Report issued in European Patent Application No. 25159225.9; Date of Mailing Aug. 7, 2025 (11 pages).

*Primary Examiner* — Eric J Zamora Alvarez

(74) *Attorney, Agent, or Firm* — CANTOR COLBURN LLP

(57) ABSTRACT

An impeller is provided for a centrifugal compressor of an aircraft engine. The impeller includes an impeller hub and an impeller shroud having an inducer portion, an exducer portion and a bend portion interposed between the inducer portion and the exducer portion. The impeller shroud is swept forwardly in the exducer portion, the impeller shroud and the impeller hub define a gap extending through the inducer portion, the bend portion and the exducer portion and the gap is characterized as having a passage area that exhibits about a 34.375% increase from 10% of the shroud chord to 45% of the shroud chord and exhibits about a −31.1628% decrease from 45% of the shroud chord to 92.5% of the shroud chord.

14 Claims, 6 Drawing Sheets

Option 3 : 2 Additional Thickness Control Sections at Distance H1 & H2 from Base Option 2 : One Additional Thickness Control Section at Distance H from Base Option 1 : Varying T1 & T2

Baseline Section at Section B-B and Above
T1 = Hub Thickness
T2 = Tip Thickness
H = Blade Span
H1/H2 = Location of Intermediate Thickness Control Section(s)

(51) Int. Cl.

| | |
|---|---|
| *F01D 5/04* | (2006.01) |
| *F02C 3/08* | (2006.01) |
| *F02C 3/14* | (2006.01) |
| *F04D 1/00* | (2006.01) |
| *F04D 29/44* | (2006.01) |

(58) Field of Classification Search
CPC ..... F01D 9/02; F01D 1/02; F01D 1/06; F01D 3/025; F01D 25/24; F01D 5/225; F01D 5/12; F01D 9/045; F01D 9/06; B64C 11/001
See application file for complete search history.

(56) References Cited

U.S. PATENT DOCUMENTS

| | | | | |
|---|---|---|---|---|
| 3,997,281 | A * | 12/1976 | Atkinson | F04D 29/444 |
| | | | | 415/207 |
| 5,595,473 | A * | 1/1997 | Nagaoka | F04D 1/06 |
| | | | | 415/199.1 |
| 6,506,015 | B2 * | 1/2003 | Nagata | F01D 1/02 |
| | | | | 415/206 |
| 7,896,618 | B2 | 3/2011 | Higashimori et al. | |
| 8,550,775 | B2 * | 10/2013 | Chen | F04D 29/4206 |
| | | | | 415/173.1 |
| 9,500,084 | B2 | 11/2016 | Warikoo et al. | |
| 9,683,576 | B2 | 6/2017 | Herran et al. | |
| 9,970,452 | B2 * | 5/2018 | Conner | F01D 5/225 |
| 10,221,858 | B2 | 3/2019 | Berenyi et al. | |
| 2004/0005220 | A1 * | 1/2004 | Kawamoto | F04D 29/284 |
| | | | | 416/223 R |
| 2011/0318188 | A1 | 12/2011 | Billotey et al. | |
| 2014/0241901 | A1 | 8/2014 | Warikoo et al. | |
| 2014/0314557 | A1 * | 10/2014 | Hiradate | F04D 29/284 |
| | | | | 415/203 |
| 2016/0238018 | A1 | 8/2016 | Conner et al. | |
| 2019/0383304 | A1 | 12/2019 | Aker et al. | |
| 2021/0054849 | A1 | 2/2021 | Nichols | |
| 2021/0156259 | A1 * | 5/2021 | Duong | F04D 29/666 |
| 2022/0042415 | A1 | 2/2022 | Kumar et al. | |

* cited by examiner

Option 3 : 2 Additional Thickness Control Sections at Distance H1 & H2 from Base Option 2 : One Additional Thickness Control Section at Distance H from Base Option 1 : Varying T1 & T2

Baseline Section at Section B-B and Above

T1 = Hub Thickness
T2 = Tip Thickness
H = Blade Span
H1/H2 = Location of Intermediate Thickness Control Section(s)

AIRCRAFT ENGINE IMPELLER WITH EXDUCER SHROUD FORWARD SWEEP

BACKGROUND

Exemplary embodiments of the present disclosure relate generally to impellers and, in some embodiments, to an impeller of a centrifugal compressor with an exducer having a forwardly swept shroud.

Centrifugal compressors designed for aerospace applications are required to operate over a wide range of flow, speed and power conditions. Acceleration rates required to go from a low-power engine state to a high-power engine state are significant, and as a result, compressors used in gas turbine engines for aerospace applications often require a significant surge margin.

Accordingly, there exists a need for improved compressors.

BRIEF DESCRIPTION

According to an aspect of the disclosure, an impeller is provided for a centrifugal compressor of an aircraft engine. The impeller includes an impeller hub and an impeller shroud having an inducer portion, an exducer portion and a bend portion interposed between the inducer portion and the exducer portion. The impeller shroud is swept forwardly in the exducer portion, the impeller shroud and the impeller hub define a gap extending through the inducer portion, the bend portion and the exducer portion and the gap is characterized as having a passage area that exhibits about a 34.375% increase from 10% of the shroud chord to 45% of the shroud chord and exhibits about a −31.1628% decrease from 45% of the shroud chord to 92.5% of the shroud chord.

In accordance with additional or alternative embodiments, the impeller shroud has a maximum curvature that is about 8-10 times larger than an average curvature.

In accordance with additional or alternative embodiments, the impeller shroud is swept forwardly away from the impeller hub in the exducer portion.

In accordance with additional or alternative embodiments, the impeller shroud is swept forwardly by an angle $\beta1$ of $0 > \beta1 > 20°$ in the exducer portion.

In accordance with additional or alternative embodiments, the impeller shroud is swept forwardly by an angle $\beta1$ of $0 > \beta1 > 15°$ in the exducer portion.

In accordance with additional or alternative embodiments, the impeller hub is swept forwardly by an angle $\beta2$ of $0 > \beta2 > 10°$ in the exducer portion.

In accordance with additional or alternative embodiments, the impeller hub includes impeller vanes disposed in the gap and including trailing edges swept forwardly in correspondence with impeller shroud forward sweep in the exducer portion.

In accordance with additional or alternative embodiments, the impeller vanes are tapered to have an increasing tip-to-hub thickness.

In accordance with additional or alternative embodiments, the impeller vanes are tapered to have an increasing tip thickness and a uniform hub thickness.

In accordance with additional or alternative embodiments, the impeller vanes are tapered to have a uniform tip thickness and an increasing hub thickness.

According to an aspect of the disclosure, an impeller is provided for a centrifugal compressor of an aircraft engine. The impeller includes an impeller hub including impeller vanes and an impeller shroud having an inducer portion, an exducer portion and a bend portion interposed between the inducer portion and the exducer portion. The impeller shroud and trailing edges of each of the impeller vanes are correspondingly swept forwardly away from the impeller hub in the exducer portion.

In accordance with additional or alternative embodiments, the impeller shroud and the impeller hub define a gap extending through the inducer portion, the bend portion and the exducer portion and the gap is characterized as having a passage area that exhibits about a 34.375% increase from 10% of the shroud chord to 45% of the shroud chord and exhibits about a −31.1628% decrease from 45% of the shroud chord to 92.5% of the shroud chord.

In accordance with additional or alternative embodiments, the impeller shroud has a maximum curvature that is about 8-10 times larger than an average curvature.

In accordance with additional or alternative embodiments, the impeller shroud is swept forwardly by an angle $\beta1$ of $0 > \beta1 > 20°$ in the exducer portion.

In accordance with additional or alternative embodiments, the impeller shroud is swept forwardly by an angle $\beta1$ of $0 > \beta1 > 15°$ in the exducer portion.

In accordance with additional or alternative embodiments, the impeller hub is swept forwardly by an angle $\beta2$ of $0 > \beta2 > 10°$ in the exducer portion.

In accordance with additional or alternative embodiments, the impeller vanes are tapered to have an increasing tip-to-hub thickness.

In accordance with additional or alternative embodiments, the impeller vanes are tapered to have an increasing tip thickness and a uniform hub thickness.

In accordance with additional or alternative embodiments, the impeller vanes are tapered to have a uniform tip thickness and an increasing hub thickness.

According to an aspect of the disclosure, a gas turbine engine of an aircraft is provided. The gas turbine engine includes a diffuser having an upstream portion and a downstream portion and an impeller. The impeller is upstream from the diffuser and includes an impeller hub. The impeller hub includes impeller vanes and an impeller shroud. The impeller shroud has an inducer portion, an exducer portion and a bend portion interposed between the inducer portion and the exducer portion. The impeller shroud and trailing edges of each of the impeller vanes are correspondingly swept forwardly away from the impeller hub in the exducer portion, the upstream portion of the diffuser is angled to smoothly interface with forward sweeps of the impeller shroud and the trailing edges of each of the impeller vanes and the downstream portion of the diffuser is arranged in parallel with a gas turbine engine center axis.

These and other advantages and features will become more apparent from the following description taken in conjunction with the drawings.

BRIEF DESCRIPTION OF THE DRAWINGS

The following descriptions should not be considered limiting in any way. With reference to the accompanying drawings, like elements are numbered alike.

These and other advantages and features will become more apparent from the following description taken in conjunction with the drawings.

DETAILED DESCRIPTION

A detailed description of one or more embodiments of the disclosed apparatus and method are presented herein by way of exemplification and not limitation with reference to the Figures.

In some turboshaft engines in some high-power operating conditions, the flow through the inlet of a centrifugal compressor can become choked, while stalling can occur in a downstream diffuser. As the airflow approaches the impeller exit, known as the "exducer", the separated airflow can form a large vortex creating flow blockage areas with high pressure losses. Large flow blockages can impose high incidence on the diffuser and reduce engine stall margins at high compressor speeds. A typical impeller shroud of a centrifugal compressor includes three parts: the exducer, the knee (or the bend) and the inducer. Each zone occupies approximately one-third of the impeller shroud length and any point on the exducer can be related to distance along the exducer itself with the beginning defined as 0% and the finish as 100%.

Due to the nature of impeller flows transforming from axial flows to radial flows over a short distance, there is a tendency for impeller shroud flow to separate starting near the knee position in an impeller. Such flow separation can lead to large flow blockages that are detrimental to both impeller and diffuser performance and operability. With recent engine design tendencies toward higher-pressure ratios, a higher-loaded impeller is needed for a more efficient and compact design. Thus, needs to reduce impeller flow separation are becoming increasingly essential.

Previously, the problem of impeller flow separation has been addressed by lengthening impeller lengths or reducing impeller pressure ratios. However, engine weight, length and performance tend to be negatively affected by these changes.

Accordingly, a need remains in effect for an improved impeller design which reduces impeller flow separation without negatively affecting engine weight, length and performance.

As will be described below, an impeller shroud is provided for a centrifugal compressor of an aircraft engine in a configuration to lessen impeller shroud flow separation. The impeller shroud is characterized as having a minimized shroud curvature around the bend/knee area that is maintained in a relatively low condition as far as possible into the exducer area. By raising the inducer shroud and lowering hub lines, a flow area is opened more quickly in the inducer area to minimize velocity before the bend. As a result of the relatively low curvature, the impeller shroud is swept forward in the exducer region to return to an original exit position. These changes can be applied to existing designs, in which the impeller exit corner points are fixed along with diffuser geometries.

Figure 1:
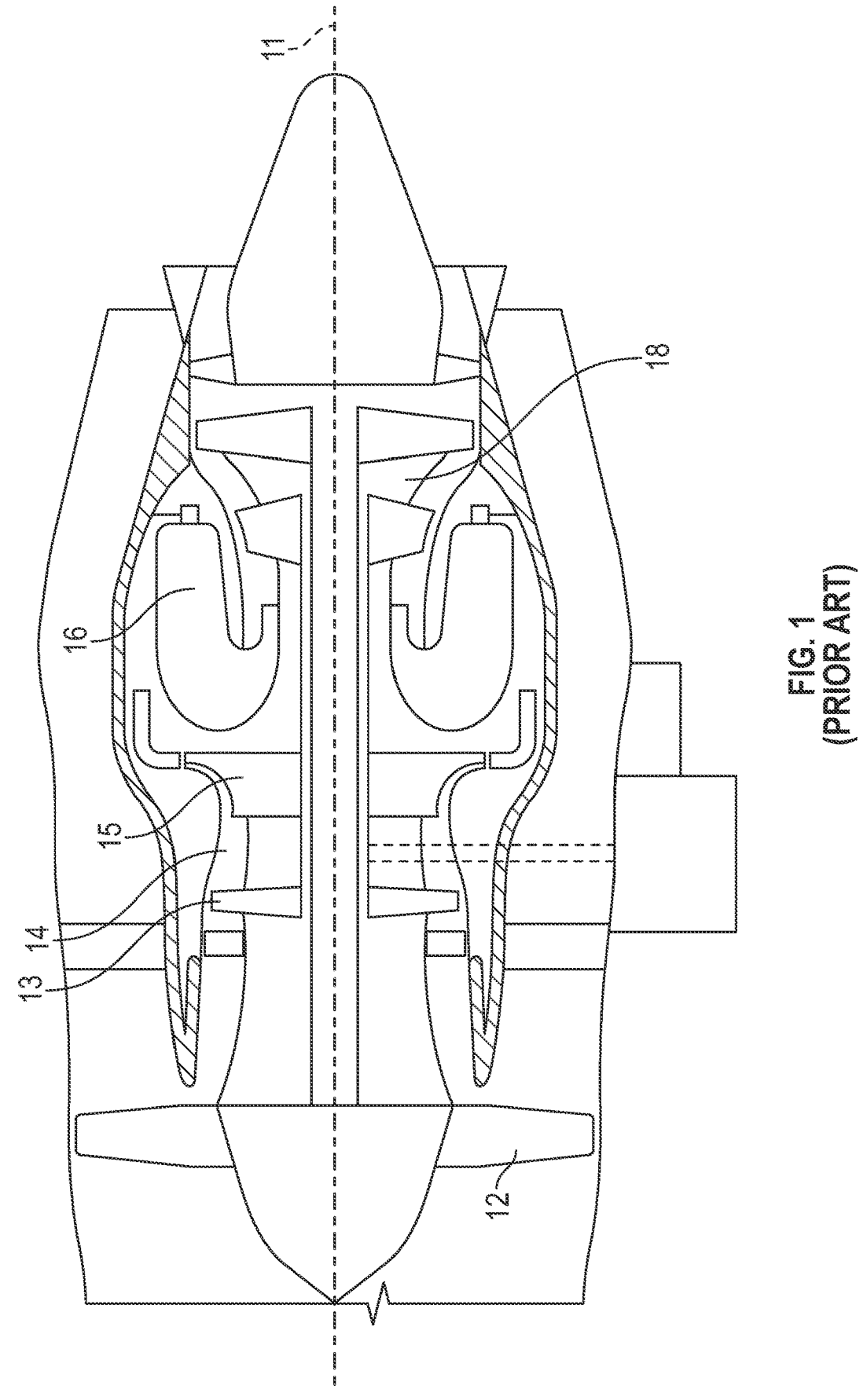
FIG. 1 is a schematic cross-sectional view of a prior art gas turbine engine in accordance with embodiments.

FIG. 1 illustrates a prior art turbofan gas turbine engine 10 of a type preferably provided for use in subsonic flight. The engine 10 generally includes in serial flow communication a fan 12 through which ambient air is propelled, a multistage compressor 14 for pressurizing the air having an axial low pressure compressor (LPC) 13 and a centrifugal high pressure compressor (HPC) 15, a combustor 16 in which the compressed air is mixed with fuel and ignited for generating an annular stream of hot combustion gases and a turbine section 18 for extracting energy from the combustion gases. The center axis 11 of the engine 10 is also illustrated.

Figure 2:
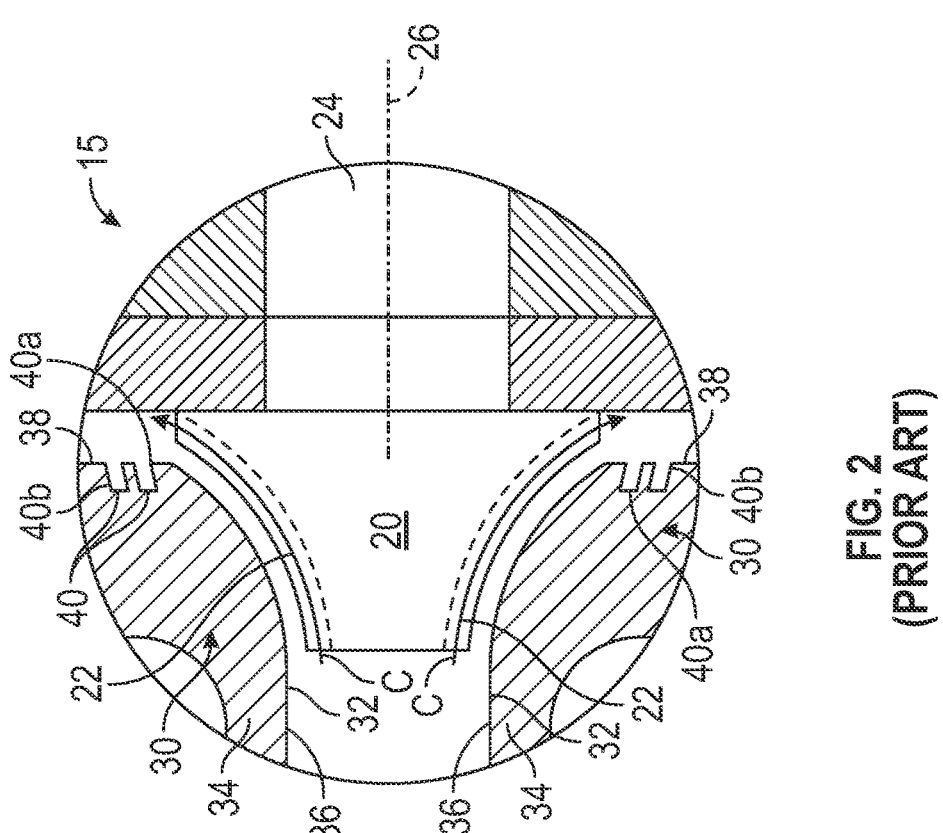
FIG. 2 is a partially-sectioned view of a centrifugal compressor of a prior art gas turbine engine in accordance with embodiments

FIG. 2 shows the prior art centrifugal HPC 15 in partial cross-section. The centrifugal HPC 15 axially receives a compressible fluid, increases the pressure of the compressible fluid and conveys it in a substantially radial direction. The working or compressible fluid can be any fluid which can experience significant variations in density and in most instances is air or another gas. The centrifugal HPC 15 includes at least an impeller 20, which increases the pressure of the compressible fluid before conveying it downstream and a surrounding impeller shroud 30, which houses the impeller 20 and provides structure to the centrifugal HPC 15.

The impeller 20 can be any device which can rotate about a central axis so as to increase the pressure of the compressible fluid. The impeller 20 has multiple impeller vanes 22, and is mounted to a shaft 24 which rotates, along with the impeller 20, about a shaft axis 26 which can be coaxial with center axis 11 of FIG. 1. The impeller shroud 30 houses or encloses the impeller 20 thereby forming a substantially closed system whereby the compressible fluid enters the impeller shroud 30, is processed, and exits the impeller shroud 30. The impeller shroud 30 has a shroud body 34, which provides the impeller shroud 30 with structure and an ability to resist loads generated by the centrifugal HPC 15 when in operation. The impeller shroud 30 also has a shroud surface 32, which is exposed to the compressible fluid and which surrounds the impeller vanes 22. The shroud surface 32 is radially spaced apart from the impeller vanes thereby defining a gap therebetween. This gap extends along the length of the shroud surface 32. The shroud surface 32 extends between an inducer portion 36 and an exducer portion 38.

Figure 3:
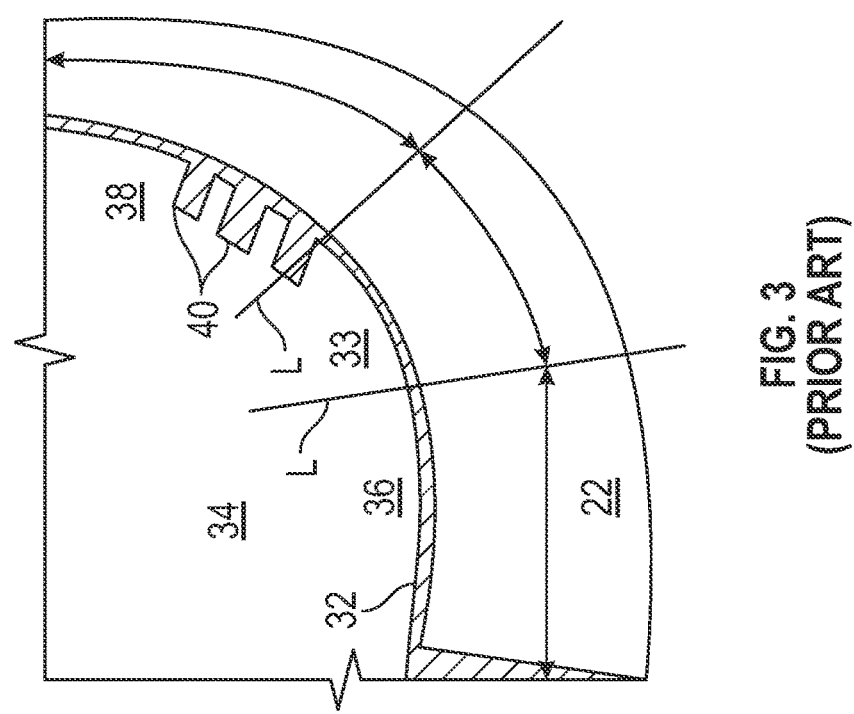
FIG. 3 is a cross-sectional view of portions of an impeller shroud surface of a centrifugal compressor of a prior art gas turbine engine in accordance with embodiments.

With reference to FIG. 3, a location and relative size of the inducer portion 36 and the exducer portion 38 can vary for example in relation to a bend portion 33 or "knee". The bend portion 33 can be defined by a bend length, which begins at a point where the substantially axial compressible fluid starts to curve or bend and ends at a point where the compressible fluid first begins to flow in a substantially radial direction. The bend portion 33 is demarcated in FIG. 3 by lines L, which extend in a direction normal to the shroud surface 32 at the location where the flow transitions from an axial direction and to a substantially radial direction. The inducer portion 36 can be any part of the shroud surface 32 which is upstream of the bend portion 33 and the exducer portion 38 can be any part of the shroud surface 32 which is downstream of the bend portion 33.

The inducer portion 36 corresponds to the part of the shroud surface 32 in proximity to the inlet of the impeller 20 and can be generally a straight-line segment which is parallel to the shaft axis 26. The exducer portion 38 corresponds to the part of the shroud surface 32 in proximity to the exit of the impeller 20 and is a substantially straight-line or curved-line segment extending from the end of the curve of the shroud surface 32. The exducer portion 38 extends radially with respect to the shaft axis 26. The exducer portion 38 helps to convey the compressible fluid downstream from the exit of the impeller 20 such as towards a diffuser system.

With reference back to FIG. 2, movement of the compressible fluid through the centrifugal HPC 15 is bounded by the shroud surface 32 along a fluid flow path C that begins in the impeller shroud 30 at the inducer portion 36 and extends toward and/or through the exducer portion 38. The fluid flow path C is located between the exterior faces of the impeller vanes 22 and the shroud surface 32. As such, the fluid flow path C follows the contour of the shroud surface 32. The rotation of the impeller 20 causes the compressible fluid to be drawn axially into the inducer portion 36 and to change direction along the fluid flow path C such that the compressible fluid is conveyed radially through the exducer portion 38.

In certain prior art cases, the impeller shroud 30 also has one or more circumferentially extending grooves 40 located within the exducer portion 38 of the shroud. Each groove 40 extends into the shroud body 34 from the shroud surface 32, thereby forming a depression or cavity extending into the shroud body 34. In some embodiments, the impeller shroud 30 can have a first circumferential groove 40a and a second circumferential groove 40b.

Figure 4:
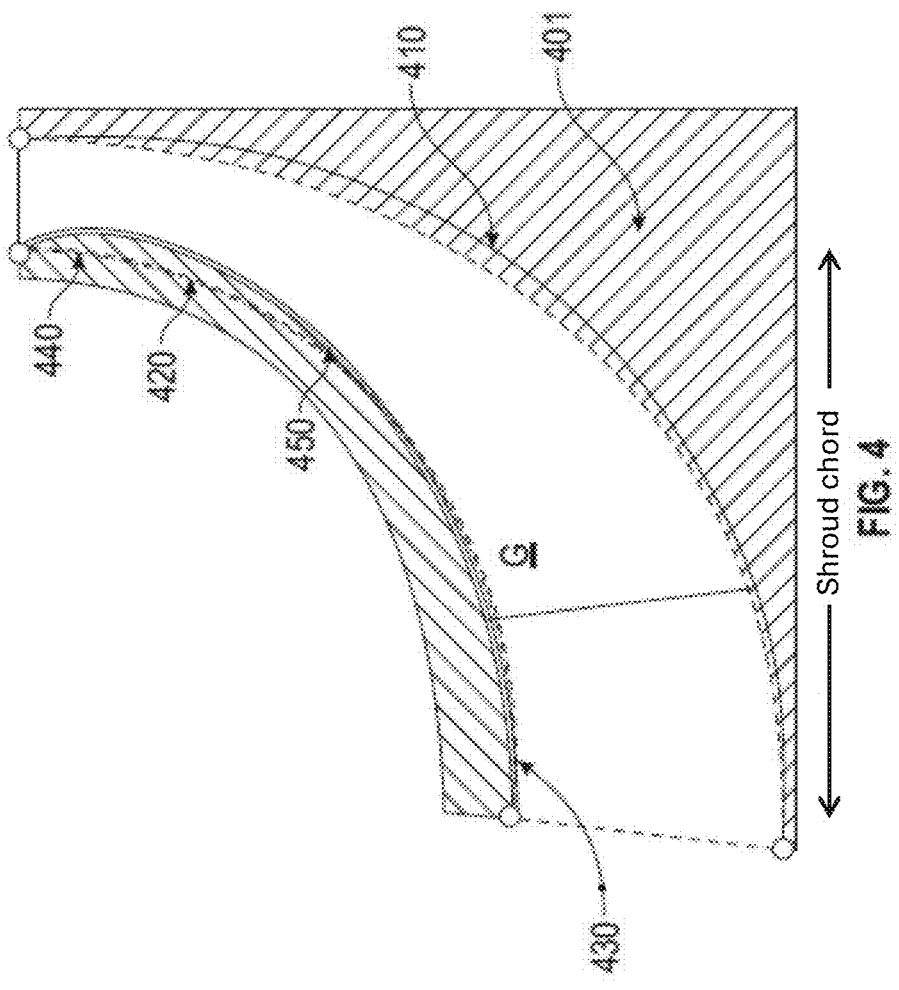
FIG. 4 is a side schematic view of an impeller shroud and an impeller hub of an impeller of a centrifugal compressor of an aircraft in accordance with embodiments.

With reference to FIG. 4, an impeller 401 is provided for a centrifugal compressor of an aircraft engine. The impeller 401 includes an impeller hub 410 and an impeller shroud 420. The impeller shroud 420 has an inducer portion 430 in which flows through the impeller 401 are generally directed in an axial direction, an exducer portion 440 in which the flows through the impeller 401 are generally directed in a radial direction and a bend portion 450. The bend portion 450 is fluidly interposed between the inducer portion 430 and the exducer portion 440 and is characterized as having a knee in which axially directed flows through the impeller 401 are re-directed toward becoming radially directed flows through the impeller 401. The impeller shroud 420 is swept forwardly and away from the impeller hub 410 in the exducer portion 440. The impeller shroud 420 and the impeller hub 410 cooperatively define a gap G extending through the inducer portion 430, the bend portion 450 and the exducer portion 440.

Figure 5:
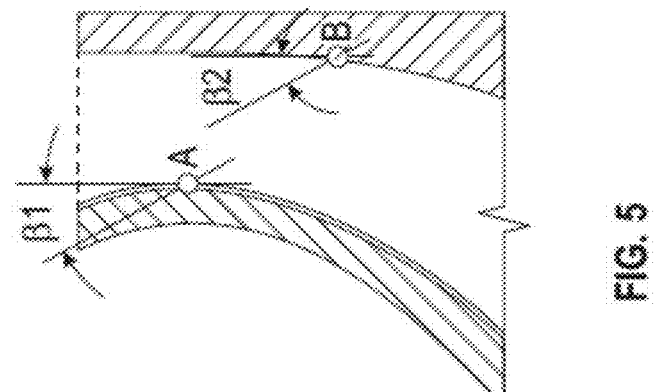
FIG. 5 is an enlarged side schematic view of an exducer portion of the impeller shroud and the impeller hub of FIG. 4 in accordance with embodiments.

With reference to FIGS. 4 and 5 and in accordance with embodiments, the impeller shroud 420 can be swept forwardly by an angle β1 of 0>β1>20° in the exducer portion 440 or, more particularly, by an angle β1 of 0>β1>15° in the exducer portion 440 (where point A is defined as 40-65% from a beginning of the exducer portion 440). Also, in accordance with additional embodiments, the impeller hub 410 can be swept forwardly by an angle β2 of 0>β2>10° in the exducer portion 440 (where point B is defined as 0-50% from a beginning of the exducer portion 440) in correspondence with the forward sweep of the impeller shroud 420.

The impeller shroud 420 is effectively raised with the impeller hub effectively lowered in the inducer portion 430 to thus open a flow area through the gap G that minimizes flow velocities ahead of the bend portion 450. The forward sweep of the impeller shroud 420 allows the impeller shroud 420 to return to an original designed exit position so that overall configurations of a gas turbine engine in which the impeller 401 is installed can be generally maintained.

The impeller shroud 420 has a maximum curvature that is about 8-10 times larger than an average curvature.

The gap G can be characterized as having a passage area that increases from about 8 in$^2$ at about 10% shroud chord to about 10.75 in$^2$ at about 45% shroud chord and that decreases from about 10.75 in$^2$ at about the 45% shroud chord to about 7.4 in$^2$ at about 92.5% shroud chord. That is, the passage area of the gap G exhibits about a 34.375% increase from 10% of the shroud chord to 45% of the shroud chord and exhibits about a −31.1628% decrease from 45% of the shroud chord to 92.5% of the shroud chord.

Figure 6:
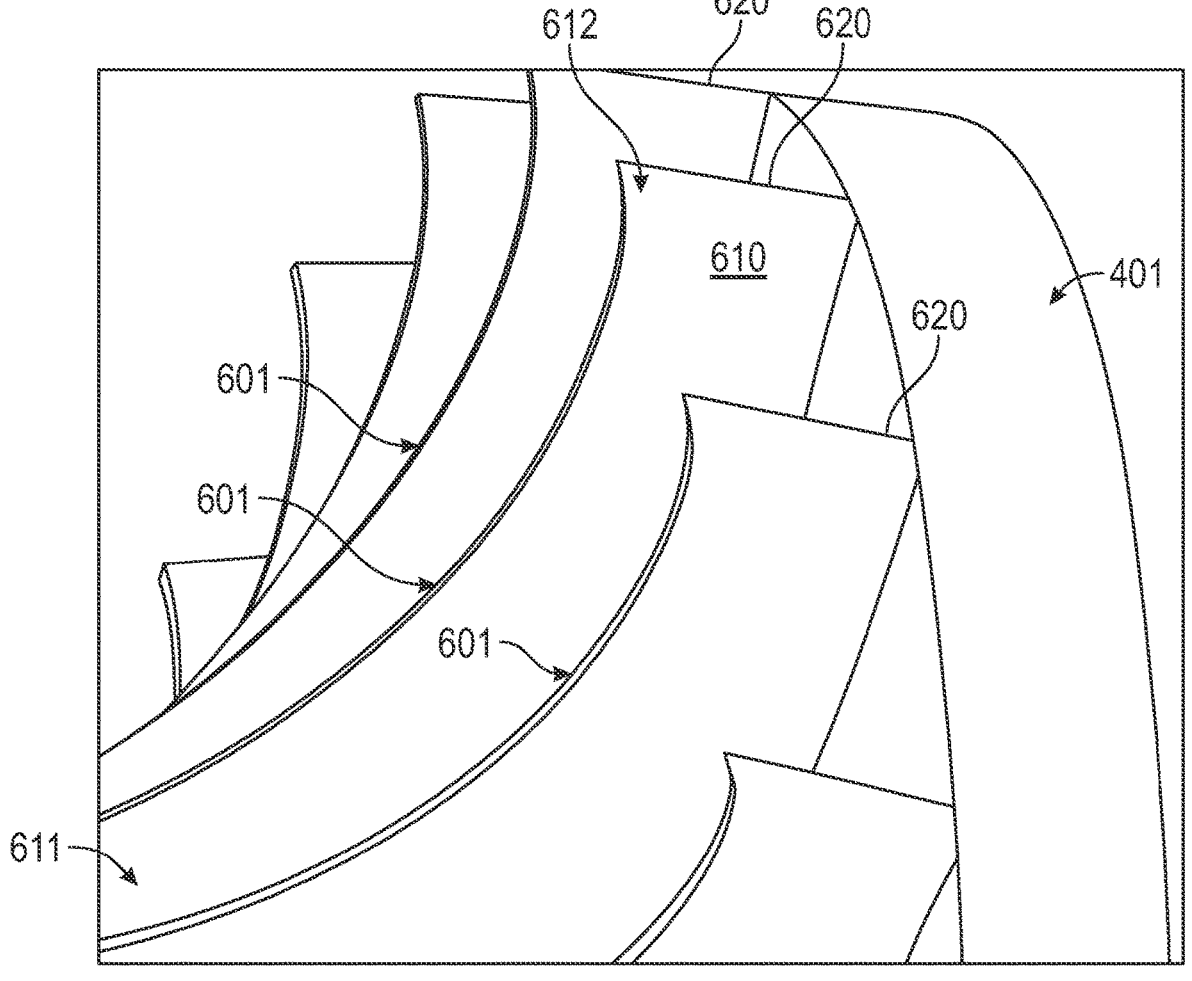
FIG. 6 is a perspective view of impeller vanes of the impeller shroud and the impeller hub of FIG. 5 in accordance with embodiments.

With reference to FIG. 6, the impeller hub 410 can include impeller vanes 601. The impeller vanes 601 are disposed in the gap G of FIG. 4 and each impeller vane 601 includes a vane body 610, which can have an aerodynamic shape with an upstream end 611 at or near the inducer portion 430 of FIG. 4 and a downstream end 612 at or near the exducer portion 440, and a trailing edge 620. The trailing edge 620 can be swept forwardly in correspondence with the forward sweep of the impeller shroud 420 in the exducer portion 440 (see FIG. 4).

Figure 7:
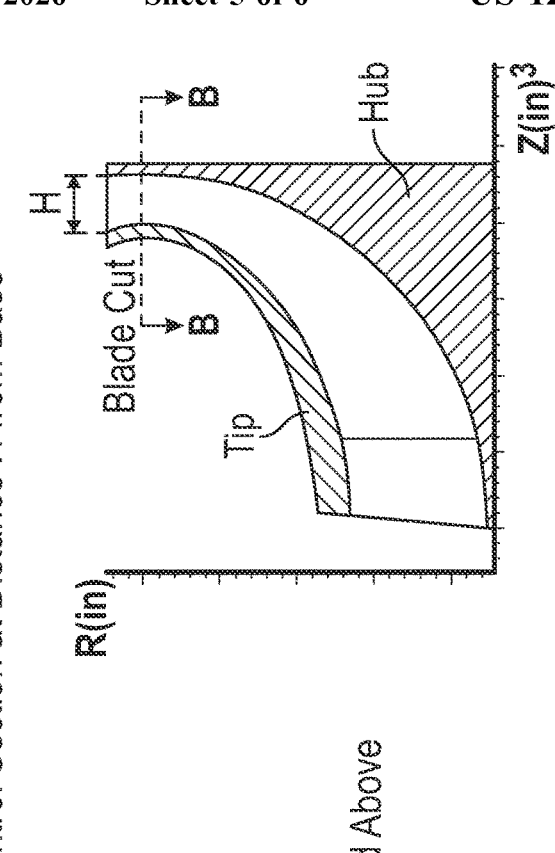
FIG. 7 are cross-sectional views of trailing edge configurations of the impeller vanes of FIG. 6 in accordance with embodiments.
Figure 7:
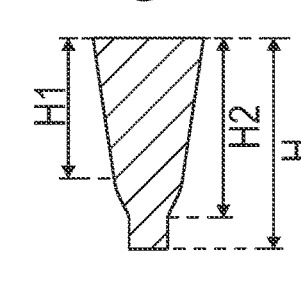
Figure 7:
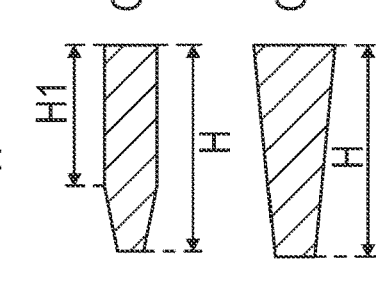
Figure 7:
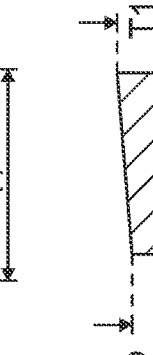

With continued reference to FIG. 6 and with additional reference to FIG. 7, the trailing edge 620 of each of the impeller vanes 601 can be configured with additional thickness to avoid a possibility of cracking or breakage. Thus, in accordance with embodiments, one or more of the impeller vanes 601 can be tapered to have an increasing tip-to-hub thickness as shown in option 1 of FIG. 7, one or more of the impeller vanes 601 can be tapered to have an increasing tip thickness and a uniform hub thickness as shown in option 2 of FIG. 7 and/or one or more of the impeller vanes 601 can be tapered to have a uniform tip thickness and an increasing hub thickness as shown in option 3 of FIG. 7.

Figure 8:
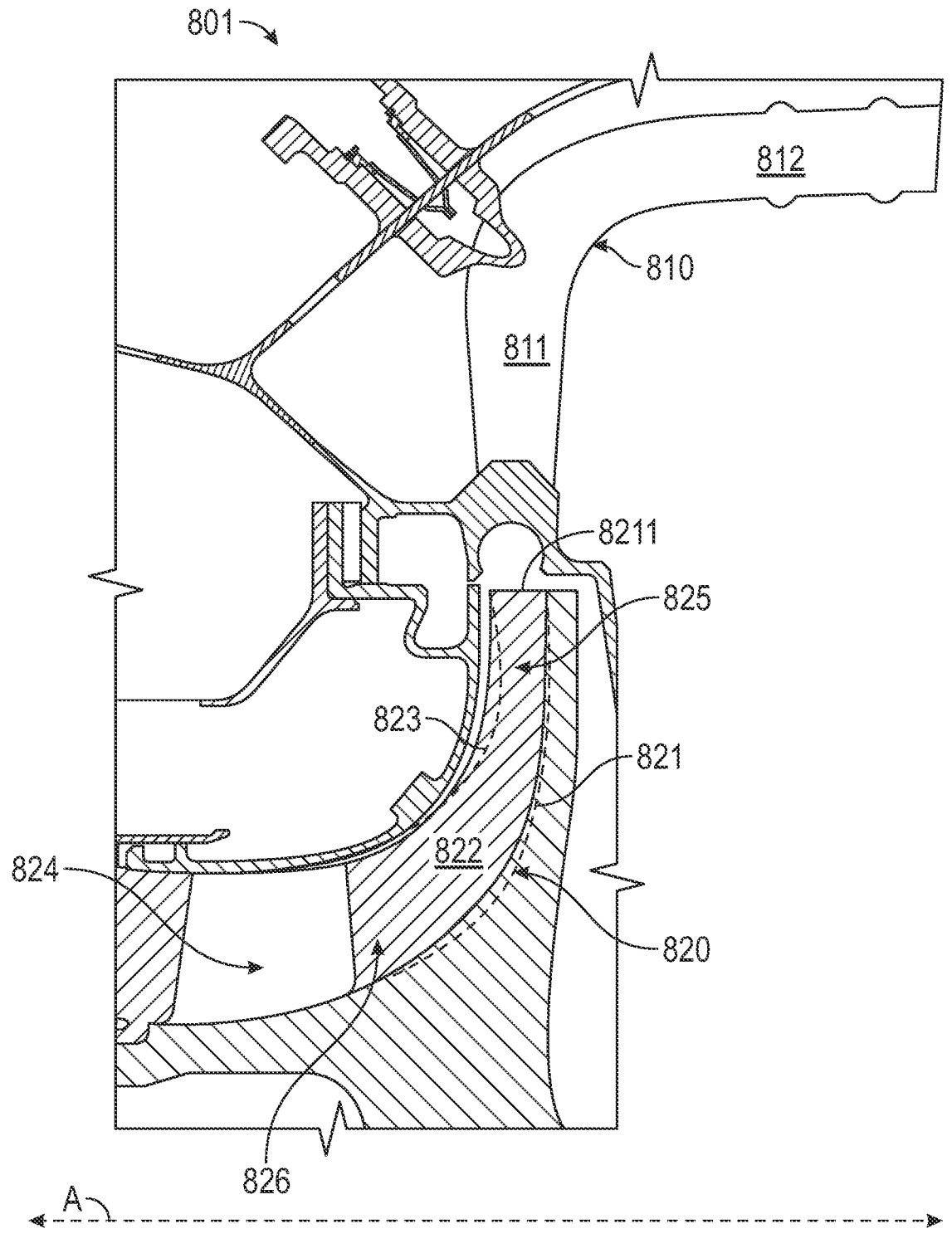
FIG. 8 is a schematic cross-sectional view of a portion of a gas turbine engine of an aircraft in accordance with embodiments.

With reference to FIG. 8, a gas turbine engine 801 of an aircraft is provided generally as described above with reference to FIGS. 1-3 described above. As shown in FIG. 8, the gas turbine engine 801 includes a diffuser 810 having an upstream portion 811 and a downstream portion 812 and an impeller 820 upstream from the diffuser 810. The impeller 820 includes an impeller hub 821 including impeller vanes 822 and an impeller shroud 823 having an inducer portion 824, an exducer portion 825 and a bend portion 826 fluidly interposed between the inducer portion 824 and the exducer portion 825. Similarly as described above, the impeller shroud 823 and trailing edges 8221 of each of the impeller vanes 822 are correspondingly swept forwardly away from the impeller hub 821 in the exducer portion 825. The upstream portion 811 of the diffuser 810 is angled to smoothly interface with the forward sweeps of the impeller shroud 823 and the trailing edges 8221 of each of the impeller vanes 822 and the downstream portion 812 of the diffuser 810 is arranged generally in parallel with a gas turbine engine center axis A.

Technical effects and benefits of the features described herein are the provision of an impeller shroud that exhibits improved centrifugal stage performance within a defined physical space by optimization of shroud and hub lines to achieve a maximum achievable diffusion before the bend/knee area while ensuring minimal flow re-acceleration at the impeller exit. While a shroud line is bored out near the end of the inducer, most of the shroud and hub gaspath changes result in lower radii, which is an additional structural benefit. Although velocities are relatively low near the trailing edge, any flow acceleration is undesirable and, to maintain a moderate increase in surface velocity, the exducer shroud is swept forward at an angle between 0 and 15 degrees. However, small acceleration can be beneficial in thinning out the boundary layer going into the diffuser, thereby offsetting the higher loss due to the higher velocity. Surface velocities can also be further lowered with a small forward sweep on the hub side between 0 and 10 degrees.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An impeller for a centrifugal compressor of an aircraft engine, the impeller comprising:
   an impeller hub; and
   an impeller shroud having an inducer portion, an exducer portion and a bend portion interposed between the inducer portion and the exducer portion,
   the impeller shroud being swept forwardly in the exducer portion by a greater degree than any degree of forward sweep of the impeller hub such that a maximum forward sweep angle of the impeller shroud from a zero sweep point of the impeller shroud exceeds a maximum forward sweep angle of the impeller hub from a zero sweep point of the impeller hub,
   the impeller shroud and the impeller hub defining a gap extending through the inducer portion, the bend portion and the exducer portion, and
   the gap being characterized as having a passage area that exhibits a 34.375% increase from 10% of a shroud chord to 45% of the shroud chord and exhibits a −31.1628% decrease from 45% of the shroud chord to 92.5% of the shroud chord,
   wherein the impeller shroud is swept forwardly by an angle of 15° or 20° in the exducer portion from the zero sweep point of the impeller shroud and the impeller hub is swept forwardly by an angle of 10° in the exducer portion from the zero sweep point of the impeller hub.

2. The impeller according to claim 1, wherein the impeller shroud has a maximum curvature that is 8-10 times larger than an average curvature of the impeller shroud.

3. The impeller according to claim 1, wherein the impeller shroud is swept forwardly away from the impeller hub in the exducer portion.

4. The impeller according to claim 1, wherein the impeller hub comprises impeller vanes disposed in the gap and with the impeller vanes comprising trailing edges swept forwardly in correspondence with impeller shroud forward sweep in the exducer portion.

5. The impeller according to claim 4, wherein the impeller vanes are tapered to have an increasing tip-to-hub thickness.

6. The impeller according to claim 4, wherein the impeller vanes are tapered to have an increasing tip thickness and a uniform hub thickness.

7. The impeller according to claim 4, wherein the impeller vanes are tapered to have a uniform tip thickness and an increasing hub thickness.

8. An impeller for a centrifugal compressor of an aircraft engine, the impeller comprising:
   an impeller hub comprising impeller vanes; and
   an impeller shroud having an inducer portion, an exducer portion and a bend portion interposed between the inducer portion and the exducer portion,
   the impeller shroud and trailing edges of each of the impeller vanes being correspondingly swept forwardly by a greater degree than any degree of forward sweep of the impeller hub and away from the impeller hub in the exducer portion such that a forward sweep angle of the impeller shroud from a zero sweep point of the impeller shroud exceeds a forward sweep angle of the impeller hub from a zero sweep point of the impeller hub,
   wherein the impeller shroud is swept forwardly by a maximum angle of 15° or 20° in the exducer portion from the zero sweep point of the impeller shroud and the impeller hub is swept forwardly by an angle of 10° in the exducer portion from the zero sweep point of the impeller hub.

9. The impeller according to claim 8, wherein:
   the impeller shroud and the impeller hub define a gap extending through the inducer portion, the bend portion and the exducer portion, and
   the gap is characterized as having a passage area that exhibits a 34.375% increase from 10% of a shroud chord to 45% of the shroud chord and exhibits a −31.1628% decrease from 45% of the shroud chord to 92.5% of the shroud chord.

10. The impeller according to claim 9, wherein the impeller shroud has a maximum curvature that is 8-10 times larger than an average curvature of the impeller shroud.

11. The impeller according to claim 8, wherein the impeller vanes are tapered to have an increasing tip-to-hub thickness.

12. The impeller according to claim 8, wherein the impeller vanes are tapered to have an increasing tip thickness and a uniform hub thickness.

13. The impeller according to claim 8, wherein the impeller vanes are tapered to have a uniform tip thickness and an increasing hub thickness.

14. A gas turbine engine of an aircraft, the gas turbine engine comprising:
   a diffuser having an upstream portion and a downstream portion; and
   an impeller upstream from the diffuser and comprising an impeller hub comprising impeller vanes and an impeller shroud having an inducer portion, an exducer portion and a bend portion interposed between the inducer portion and the exducer portion,
   the impeller shroud and trailing edges of each of the impeller vanes being correspondingly swept forwardly by a greater degree than any degree of forward sweep of the impeller hub and away from the impeller hub in the exducer portion such that a forward sweep angle of the impeller shroud from a zero sweep point of the impeller shroud exceeds a forward sweep angle of the impeller hub from a zero sweep point of the impeller hub, the upstream portion of the diffuser being angled to smoothly interface with forward sweeps of the impeller shroud and the trailing edges of each of the impeller vanes, and the downstream portion of the diffuser being arranged in parallel with a gas turbine engine center axis, wherein the impeller shroud is swept forwardly by a maximum angle of 15° or 20° in the exducer portion from the zero sweep point of the impeller shroud and the impeller hub is swept forwardly by an angle of 10° in the exducer portion from the zero sweep point of the impeller hub.

* * * * *